(12) United States Patent
Rashid et al.

(10) Patent No.: US 8,737,383 B2
(45) Date of Patent: May 27, 2014

(54) TECHNIQUES FOR ENHANCED PERSISTENT SCHEDULING WITH EFFICIENT LINK ADAPTATION CAPABILITY

(75) Inventors: Mohammad Mamunur Rashid, Vancouver (CA); Rath Vannithamby, Portland, OR (US); Shweta Shrivastava, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1172 days.

(21) Appl. No.: 12/290,903

(22) Filed: Nov. 4, 2008

(65) Prior Publication Data

US 2010/0002681 A1 Jan. 7, 2010

Related U.S. Application Data

(60) Provisional application No. 61/134,188, filed on Jul. 7, 2008.

(51) Int. Cl.
*H04L 12/66* (2006.01)

(52) U.S. Cl.
USPC .......................................... 370/352

(58) Field of Classification Search
None
See application file for complete search history.

(56) References Cited

U.S. PATENT DOCUMENTS

| 2003/0063587 A1* | 4/2003 | Cho et al. ...................... 370/335 |
| 2007/0121542 A1 | 5/2007 | Lohr et al. |
| 2008/0062178 A1 | 3/2008 | Khandekar et al. |
| 2008/0089354 A1 | 4/2008 | Yoon et al. |
| 2008/0101281 A1 | 5/2008 | Harris et al. |
| 2008/0219219 A1* | 9/2008 | Sartori et al. ................. 370/335 |
| 2008/0228878 A1* | 9/2008 | Wu et al. ....................... 709/205 |
| 2009/0207796 A1* | 8/2009 | Chakraborty et al. ........ 370/329 |

FOREIGN PATENT DOCUMENTS

| CN | 1433228 A | 7/2003 |
| CN | 1433288 A | 7/2003 |
| CN | 101677431 A | 7/2009 |
| EP | 2327194 A2 | 6/2011 |
| TW | 201016061 A | 4/2010 |
| WO | 2010005852 A2 | 7/2009 |
| WO | 2010/005852 A2 | 1/2010 |
| WO | 2010/005852 A3 | 4/2010 |

OTHER PUBLICATIONS

International Preliminary Report on Patentability received for PCT Patent Application No. PCT/US2009/049452, mailed on Jan. 20, 2011, 7 pages.

International Search Report/Written Opinion for Patent Application No. PCT/US2009/049452, mailed Feb. 11, 2010, 12 pages.

Office Action received for Chinese Patent Application No. 200910158405.7, mailed on Dec. 7, 2012, 19 pages of Office Action including 12 pages of English translation.

(Continued)

*Primary Examiner* — Chi Pham
*Assistant Examiner* — Kouroush Mohebbi
(74) *Attorney, Agent, or Firm* — Thorpe North & Western, LLP

(57) ABSTRACT

An embodiment of the present invention provides a method, comprising, enhancing persistent scheduling with efficient link adaptation capability by grouping Voice over internet Protocol (VoIP) users and using an intelligent bitmap mechanism to compactly represent persistent allocations for the users within the group.

25 Claims, 3 Drawing Sheets

(56) References Cited

OTHER PUBLICATIONS

Office Action received for Taiwan Patent Application 98122654, mailed on Feb. 1, 2013, 24 pages of Office Action including 16 pages of English translation.
Office Action received for Chinese Patent Application No. 200910158405.7, mailed on May 9, 2013, 12 pages of Office Action including 8 pages on English translational.
Application Serial No. 200910158405.7, Office Action Received Apr. 23, 2012, 7 pages (4 pages of Translation).
International Search Report and Written Opinion received Feb. 11, 2012 for PCT Application Serial No. PCT/US2009/049452, 12 pages.
International Preliminary Report on Patentability received Jul. 1, 2009 for PCT/US2009/049452, 8 pages.

* cited by examiner

TECHNIQUES FOR ENHANCED PERSISTENT SCHEDULING WITH EFFICIENT LINK ADAPTATION CAPABILITY

CROSS-REFERENCE TO RELATED APPLICATIONS

The present application claims the benefit of U.S. provisional application Ser. No. 61/134,188, filed Jul. 7, 2008, entitled "Techniques and Improvements for Broadband Wireless Networks," the entire content of which is incorporated by reference herein.

BACKGROUND

In wireless networks, persistent scheduling takes advantage of the traffic characteristics of Voice over IP (VoIP) to increase the number of VoIP users in systems such as those conforming to the Institute for Electronic and Electrical Engineers (IEEE) 802.16 standard based WiMax, 3GPP LTE and 3GPP3 UMB systems. The periodic nature of the packet arrivals from a VoIP source allows the needed resource to be allocated persistently for the period of an active talk spurt. Consequently, base stations (BS) can send the allocation information once at the beginning of a talk spurt and avoid sending the allocation information anew for each subsequent packet. Significant resources that would otherwise be occupied by unnecessary overhead can now be used to accommodate VoIP packets from more users. Because VoIP packets are usually small in size, the savings from reduced overhead can significantly boost the overall system capacity. The capacity gain from persistent scheduling, however, can be compromised significantly due to dynamic link adaptation, which is a very common technique in wireless systems to adjust to dynamic variation in wireless channel quality.

Thus, a strong need exists for techniques for enhanced persistent scheduling with an efficient link adaptation capability.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
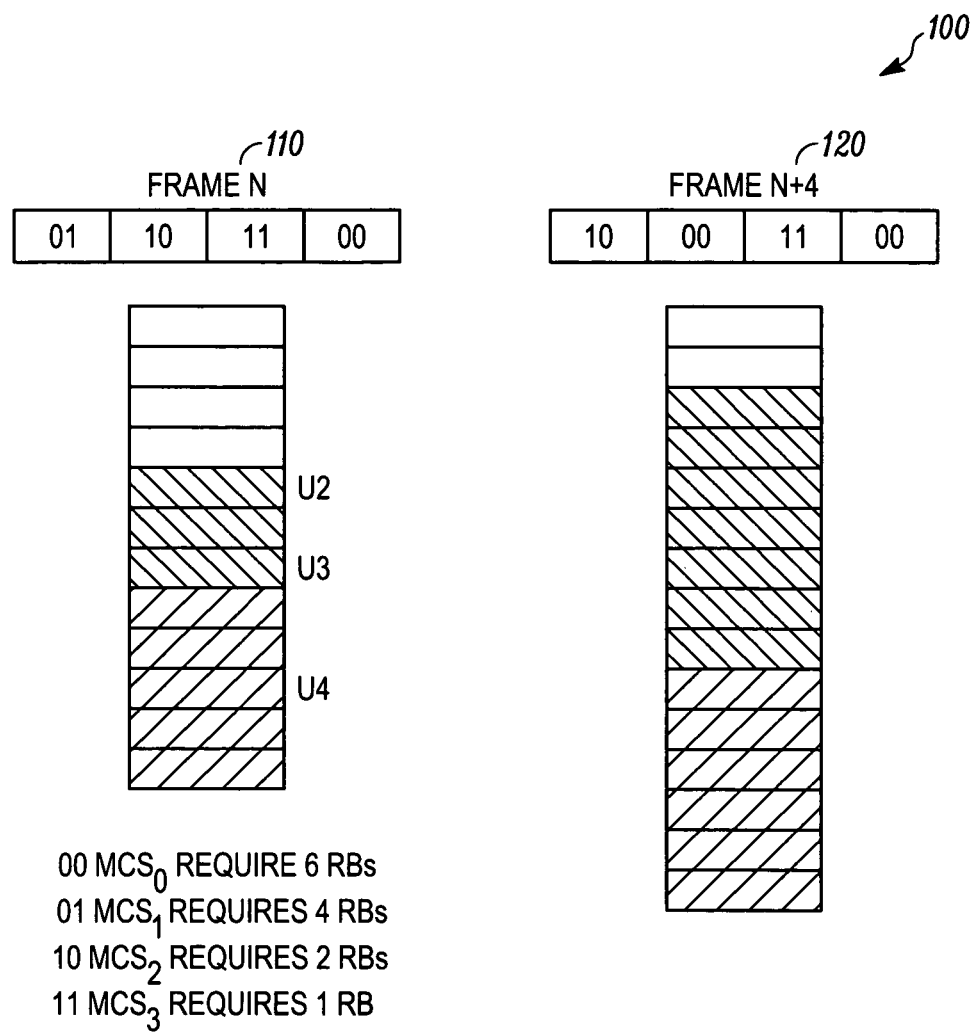
FIG. 1 illustrates handling link adaptation within an MCS cluster of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a persistent scheduling mechanism that can maintain VoIP capacity improvement by adding efficient link adaptation capability in 802.16m WiMax systems. Link adaptation poses an important challenge to the benefits of persistent scheduling. When link adaptation is used in 802.16m WiMax systems, the number of resource blocks (RBs) needed for a VoIP packet depends on the Modulation and Coding Scheme (MCS) selected to transmit the packet over the wireless link to the pertaining user. As the channel quality of the user changes from frame to frame, the MCS selected for the packet is adjusted and thus, the number of RBs has to be changed accordingly. If users are persistently allocated on an individual basis, this change in the resource allocation due to MCS change has to be conveyed explicitly incurring message overhead that persistent scheduling is aimed to avoid. Therefore, the benefit of persistent scheduling starts to diminish when MCS change becomes frequent due to link adaptation. This conjecture has been verified by simulation experiments, where as much as 40% of persistent allocations in a frame are affected by MCS changes even in a low mobility scenario.

Current persistent scheduling proposals do not provide a very efficient mechanism to deal with link adaptations. Individual and group based schemes are the two types of proposals laid out for persistent scheduling. Individual persistent scheduling allocates resources for each user individually. The proposals in this category advocate de-allocating and re-allocating the persistently allocated resources in case an MCS change occurs from one persistently scheduled frame to the other for a particular user. On the other hand, previous group based persistent scheduling, which offers better resource packing and multiplexing gains compared to those from individual persistent scheduling proposals, is also vulnerable to a significant increase of overhead from MCS changes. One possible way to avoid this overhead could be to fix the MCS to a very conservative value to cancel out the effect of link adaptation. However, this will lead to a very sharp decrease in spectral efficiency and will drastically reduce the system capacity as a result. Therefore, there is a need for a persistent scheduling scheme that can deal with link adaptations with a minimal effect on the overhead.

Embodiments of the present invention provide a group based persistent scheduling mechanism where a novel grouping scheme for VoIP users is introduced along with an intelligent bitmap mechanism to compactly represent persistent allocations for the users within a group. In order to form the groups, an embodiment of the present invention starts by defining MCS clusters that are composed of neighboring MCSs selected from the pool of MCSs occurring in the system. Neighboring MCSs are those MCSs that are more likely to be selected for any particular user when link adaptation occurs due to changing channel conditions. When a persistent allocation is scheduled for a user, it is assigned to the group that represents the MCS cluster that the user's current MCS belongs to. The user will have to be switched to another group only if its link adaptation makes switching between MCS clusters necessary. A group change for a user will necessitate sending control information to remove the user from the previous group to the next group.

However, since the MCS clusters are formed intelligently to keep this switching probability at a very low level, a user will be less likely to change groups. Any persistent scheduling proposal will encounter significant control overhead every time the MCS changes for a user. By keeping the group change frequency to a very low level, the scheme of an embodiment of the present invention may avoid a significant amount of control overhead. A bitmap is included within a group's allocation information when that group's allocation has to be updated. The bitmap indicates a 2 bit representation of each user's MCS, although the present invention is not limited in this respect. There is a one-to-one relationship between the MCS and the number of RBs needed for that MCS. This relationship is known to the users who also get information on their position in the bitmap during their initial allocation to the group. Therefore, a user can find the starting RB of its allocation in the group by scanning the bitmap and from the knowledge of its position in the bitmap. Since the starting RB location for a group will be known to the users belonging to that group, a user will thus be able to find the absolute RB location of its allocation in the frames that the user is scheduled in. It is noted, but not limited in this respect, that a 2 bit representation of the MCS of a user enables 4 MCSs to be clustered for a group.

It is noted that a VoIP user may be scheduled only in every nth frame, where n is the frame duration of the VoIP codec. Therefore, the persistently scheduled user monitors the allocation information pertaining to its group only at every nth frame. The VoIP codec's frame duration essentially becomes the persistent allocation period for the users using that VoIP codec. If a user's MCS changes due to link adaptation, the change in most of the cases can be reflected by simple update of the two bits representing the user's new MCS in the corresponding group's bitmap.

Looking now at FIG. 1, generally at 100, is shown an illustrative example, where n=4 is the persistent allocation period. In FIG. 1 frame N is shown at 110 and frame N+4 at 120. The MCS change is thus handled without any extra overhead. In some scenarios, which are expected to occur with a very low probability because of the present invention's intelligent MCS clustering mechanism, may necessitate the user to switch groups. This will involve removing the user from its current group and performing a new persistent allocation by adding to the group that represents the MCS cluster containing the user's new MCS.

Embodiments of the present invention further provide a channel quality and timer thresholds mechanism that will prevent oscillation (ping-pong) of a user among adjacent groups. Such oscillation may occur, albeit in rare situations due to some specific propagation environment around a user. To avoid this ping-pong effect, in an embodiment of the present invention, the base station could use a threshold, i.e., if the channel condition of the mobile station becomes higher/less than the threshold over/under the channel condition of lower/upper bound range of the higher/lower MCS group then you can move the mobile station to the group with higher/lower MCS. The ping-pong effect can be controlled by adjusting the threshold.

Figure 2:
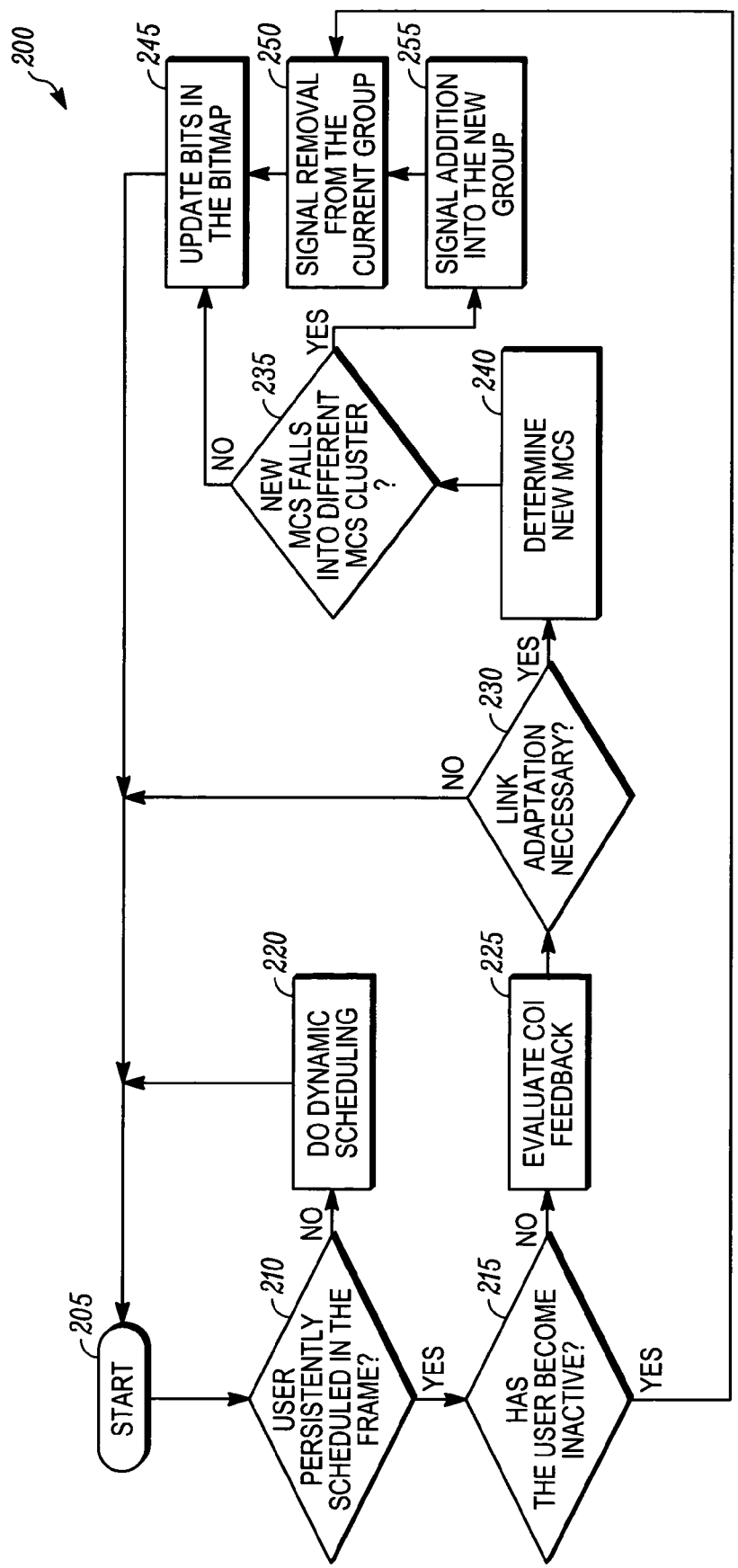
FIG. 2. illustrates an overview of the base station procedure for each user scheduled in a frame when our enhanced persistent scheduling scheme with its efficient grouping concept is implemented in an embodiment of the present invention.

Turning now to FIG. 2, generally shown as 200, is the base station procedure for each user scheduled in a frame when the present invention's enhanced persistent scheduling scheme with its efficient grouping concept is implemented. The algorithm starts at 205 and continues to 210 where a determination of whether or not a user persistently scheduled in the frame. If YES, then at 215 a determination is made as to whether the user has become inactive. If YES, then at 250 signal removal from the current group is accomplished and at 245 update the bits in the bitmap and return to 205. If NO at 210, then do dynamic scheduling at 220 and return to start 205. If NO at 215, the evaluate CQI feedback at 225 and at 230 determine if link adaptation is necessary. If NO at 230, turn to start 205. If YES at 230 determine new MCS at 240 and at 235 determine if the new MCS falls into different cluster. If NO at 235, update bits in the bitmap at 245 and return to start 205. If YES at 235, perform signal addition into the new group at 255, signal removal from the current group at 250, update bits in the bitmap at 245 and return to start 205.

Figure 3:
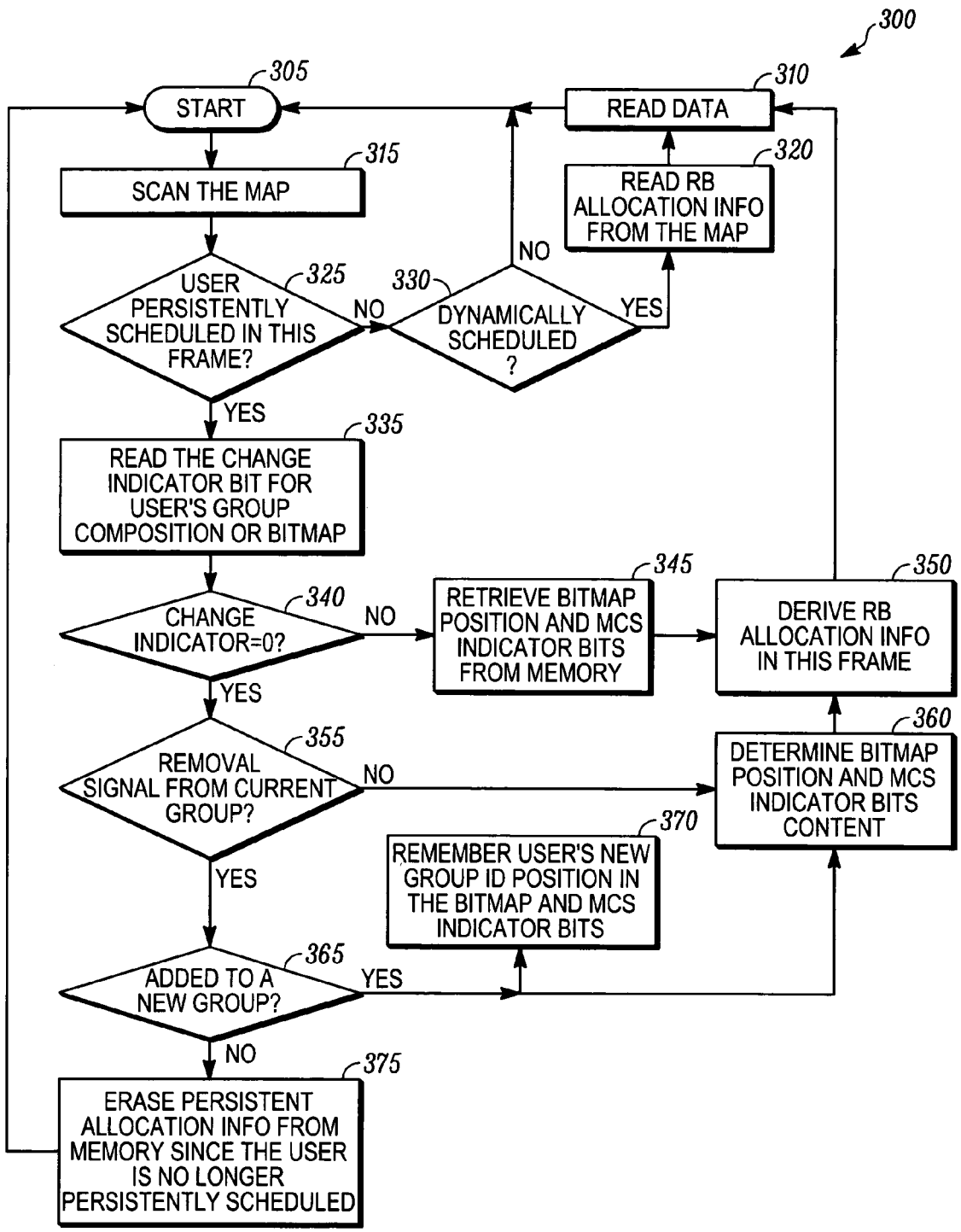
FIG. 3 provides an overview of a mobile station procedure allowing efficient handling of link adaptation through the enhanced persistent scheduling mechanism of embodiments of the present invention.

Looking now at FIG. 3, generally at 300, is a Mobile Station Procedure of an embodiment of the present invention wherein the mobile station procedure allows efficient handling of link adaptation through our enhanced persistent scheduling mechanism. The algorithm starts at 305 and continues to 315 to scan the MAP and then to 325 to determine if user persistently scheduled in this frame. If YES at 325, at 335 read the change indicator bit for user's group composition or bitmap and continue to 340 to determine if a change indicator=0. If YES at 340, at 355 determine if remove signal from the current group. If YES at 355, at 365 determine if added to a new group. If NO at 365, erase persistent allocation info from memory since the user is no longer persistently scheduled at 375. If YES at 365, at 370 remember user's new group ID, position in the bitmap and MCS indicator bits, at 360 determine bitmap position and MCS indicator bits content, at 350 derive RB allocation info in this frame, at 310 read data and then return to start 305. If NO at 355, at 360 determine bitmap position and MCS indicator bits content, at 350 derive RB allocation info in this frame, at 310 read data and then return to start 305. If NO at 340, at 345 retrieve bitmap position and MCS indicator bits from memory, at 350 derive RB allocation info in this frame, at 310 read data and then return to start 305. If NO at 325, at 330 determine if dynamically scheduled. If YES at 330, at 320 read RB allocation info from the MAP, at 310 read data and return to start 305. If NO at 330, return to start 305.

Embodiments of the present invention have the advantages of providing significant reduction in control overhead and improving the VoIP capacity by efficient handling of link adaptation during persistent scheduling. Simulation experiments show that the present invention may achieve nearly 30 percent more VoIP capacity compared to the capacity achievable from individual persistent allocation schemes. Compared to existing group based mechanism, the present invention may gain an extra 13% of VoIP capacity.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method, comprising:
   under control of one or more computer systems having memory and a processor to execute instructions:
   enhancing persistent scheduling with efficient link adaptation capability at a base station by grouping Voice over internet Protocol (VoIP) users and
   using an intelligent bitmap mechanism to compactly represent persistent allocations for the users within said group,
   wherein said grouping is accomplished by defining Modulation and Coding Scheme (MCS) clusters, and
   wherein each MCS cluster is comprised of neighboring MCSs that use a same number of resource blocks to transmit a VoIP packet.

2. The method of claim 1, wherein neighboring MCSs are intelligently selected from a pool of MCSs occurring in a system.

3. The method of claim 1, wherein when a persistent allocation is scheduled for a user, the user is assigned to a group representing a MCS cluster associated with said user's current MCS, and wherein said user will be switched to another group only if the user's link adaptation necessitates switching between MCS clusters.

4. The method of claim 3, wherein switching a user to another group necessitates sending control information to remove said user from a previous group to the next group.

5. The method of claim 1, wherein said intelligent bitmap is included within said group's allocation information when that group's allocation is updated, and wherein said intelligent bitmap indicates a n-bit representation of each user's group.

6. The method of claim 5, wherein a one-to-one relationship exists between the group and the number of resource blocks (RBs) needed for that group.

7. The method of claim 6, wherein users know said one-to-one relationship, wherein each user knows its respective position in said bitmap at initial allocation to said group, and wherein a user can determine the starting RB of its allocation in said group by scanning said bitmap and from knowing its position in said bitmap.

8. The method of claim 1, further comprising a channel quality and timer threshold mechanism that prevents oscillation of a user among adjacent groups.

9. The method of claim 8, wherein if said channel condition of a mobile station becomes higher/less than said threshold or over/under the channel condition of lower/upper bound range of the higher/lower MCS group, then a mobile station is moved to group with higher/lower MCS.

10. An apparatus including a wireless station operable in a wireless network, comprising:
    a processor;
    a memory storing instructions that, when executed by the processor, cause the apparatus to:
    enhance persistent scheduling with efficient link adaptation capability by grouping Voice over internet Protocol (VoIP) users and
    use an intelligent bitmap mechanism to compactly represent persistent allocations for the users within said group,
    wherein a wireless station is selected from the group consisting of base stations and mobile stations
    wherein said grouping is accomplished by defining Modulation and Coding Scheme (MCS) clusters, and
    wherein each MCS in an MCS cluster uses a same number of resource blocks to transmit a VoIP packet.

11. The apparatus of claim 10, wherein said Modulation and Coding Scheme (MCS) clusters are composed of MCSs selected from a pool of MCSs occurring in a system.

12. The apparatus of claim 11, wherein when a persistent allocation is scheduled for a user, the user is assigned to a group representing a MCS cluster associated with said user's current MCS, and wherein said user will be switched to another group only if link adaptation necessitates switching between MCS clusters.

13. The apparatus of claim 12, wherein switching a user to another group necessitates sending control information to remove said user from a previous group to the next group.

14. The apparatus of claim 13, wherein said intelligent bitmap is included within said group's allocation information when that group's allocation is updated, and wherein said bitmap indicates a n-bit representation of each user's MCS.

15. The apparatus of claim 14, wherein a one-to-one relationship exists between the MCS and the number of resource blocks (RBs) needed for that MCS.

16. The apparatus of claim 15, wherein users know said one-to-one relationship, wherein each user knows its position in said bitmap at initial allocation to said group, and wherein a user can determine the starting RB of its allocation in said group by scanning said bitmap and from knowing its position in said bitmap.

17. The apparatus of claim 10, further comprising a channel quality and timer threshold mechanism that prevents oscillation of a user among adjacent groups.

18. The apparatus of claim 17, wherein if said channel condition of a mobile station becomes higher/less than said threshold or over/under the channel condition of lower/upper bound range of the higher/lower MCS group, then a mobile station is moved to group with higher/lower MCS.

19. A non-transitory machine-accessible medium that provides instructions, which when accessed, cause a wireless station having a processor and memory selected from a group consisting of base stations and mobile stations to perform operations comprising:
    enhancing persistent scheduling with efficient link adaptation capability by
    grouping Voice over internet Protocol (VoIP) users and
    using an intelligent bitmap mechanism to compactly represent persistent allocations for the users within said group,
    wherein said grouping is accomplished by defining Modulation and Coding Scheme (MCS) clusters, and
    wherein each MCS in an MCS cluster uses a same number of resource blocks to transmit a VoIP packet.

20. The non-transitory machine-accessible medium of claim 19, wherein neighboring MCSs are intelligently selected from a pool of MCSs occurring in a system.

21. The non-transitory machine-accessible medium of claim 19, wherein when a persistent allocation is scheduled for a user, the user is assigned to a group representing a MCS cluster associated with said user's current MCS, and wherein said user will be switched to another group only if link adaptation necessitates switching between MCS clusters.

22. The non-transitory machine-accessible medium of claim 21, wherein switching a user to another group necessitates sending control information to remove said user from a previous group to the next group.

23. The non-transitory machine-accessible medium of claim 19, wherein said intelligent bitmap is included within said group's allocation information when that group's allocation is updated, and wherein said bitmap indicates a n-bit representation of each user's MCS.

24. The non-transitory machine-accessible medium of claim 23, wherein a one-to-one relationship exists between the MCS and the number of resource blocks (RBs) needed for that MCS.

25. The non-transitory machine-accessible medium of claim 24, wherein users know said one-to-one relationship, wherein each user knows its respective position in said bitmap at initial allocation to said group, and wherein a user can determine the starting RB of its allocation in said group by scanning said bitmap and from knowing its position in said bitmap.

\* \* \* \* \*